(12) United States Patent
Kim

(10) Patent No.: US 7,876,388 B2
(45) Date of Patent: Jan. 25, 2011

(54) ARRAY SUBSTRATE CAPABLE OF IMPROVING DISPLAY QUALITY

(75) Inventor: Dong-Gyu Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 160 days.

(21) Appl. No.: 11/788,502

(22) Filed: Apr. 20, 2007

(65) Prior Publication Data

US 2007/0257876 A1 Nov. 8, 2007

(30) Foreign Application Priority Data

Apr. 24, 2006 (KR) .................. 10-2006-0036526

(51) Int. Cl.
*G02F 1/1343* (2006.01)
(52) U.S. Cl. .......................... 349/39; 349/38
(58) Field of Classification Search ............ None
See application file for complete search history.

(56) References Cited

U.S. PATENT DOCUMENTS

| | | | |
|---|---|---|---|
| 5,844,641 A * | 12/1998 | Jun et al. .................. 349/38 |
| 5,943,106 A * | 8/1999 | Sukenori et al. .............. 349/39 |
| 6,337,726 B1 * | 1/2002 | Kawano et al. ............. 349/141 |
| 2003/0107687 A1 * | 6/2003 | Choo et al. ................... 349/39 |
| 2003/0112383 A1 * | 6/2003 | Kim ........................... 349/43 |
| 2003/0117535 A1 * | 6/2003 | Park et al. .................... 349/39 |
| 2004/0114059 A1 * | 6/2004 | Lee et al. ..................... 349/39 |
| 2008/0001877 A1 * | 1/2008 | Kim et al. .................... 345/87 |

* cited by examiner

*Primary Examiner*—Mike Stahl
(74) *Attorney, Agent, or Firm*—Innovation Counsel LLP

(57) ABSTRACT

The charging voltage of a pixel electrode varies when there is a photo-misalignment of the pixel electrode, and such variation degrades the display quality. An array substrate that prevents fluctuation in the charging voltage of a pixel electrode is presented. The array substrate includes a pixel electrode, a gate wiring formed on the pixel electrode, and a data wiring that includes a first data line and a second data line formed two sides of the pixel electrode. A first voltage-maintaining electrode is separated from a first side of the first data line by a first distance, and a second voltage-maintaining electrode is separated from a second side of the first data line by a second distance. Both voltage-maintaining electrodes are electrically connected to the pixel electrode. A thin-film transistor is electrically connected to the gate wiring, the data wiring and the pixel electrode.

21 Claims, 13 Drawing Sheets

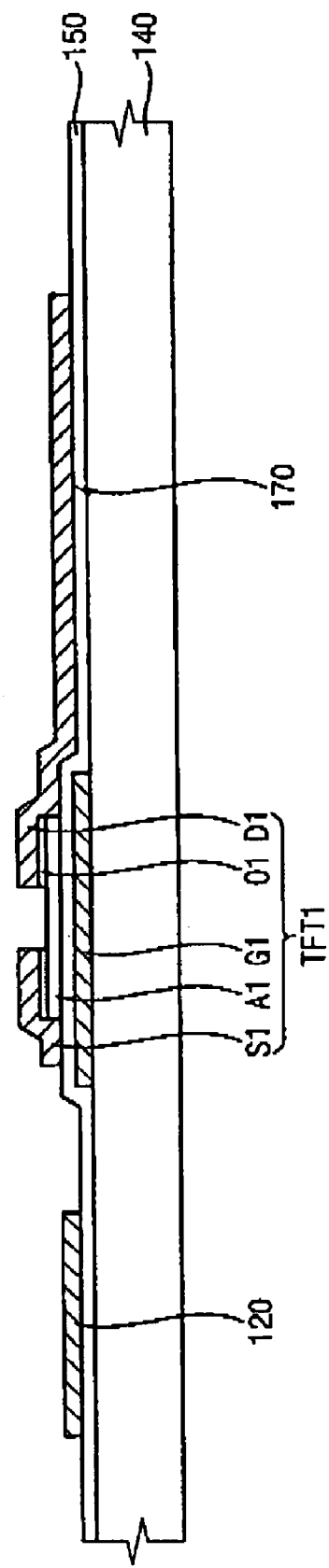

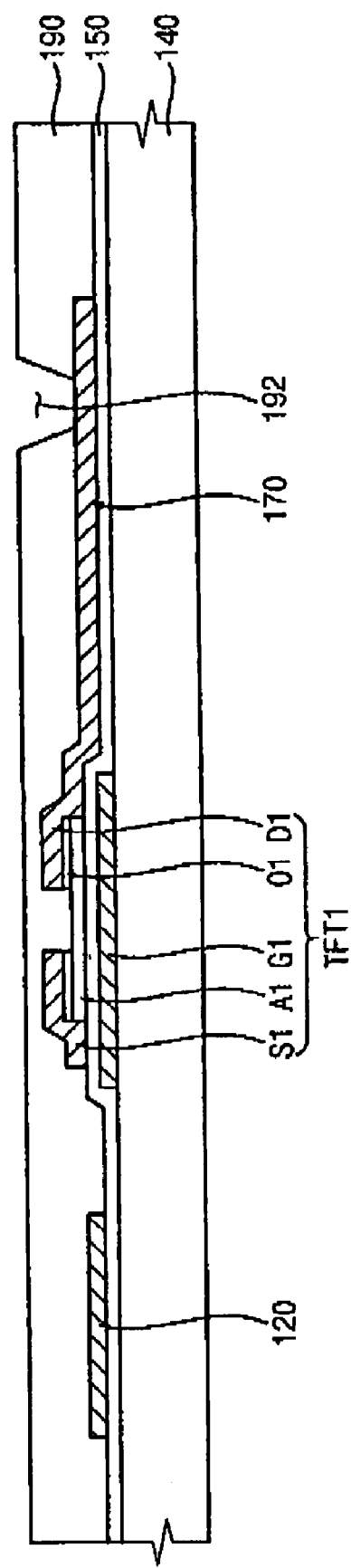

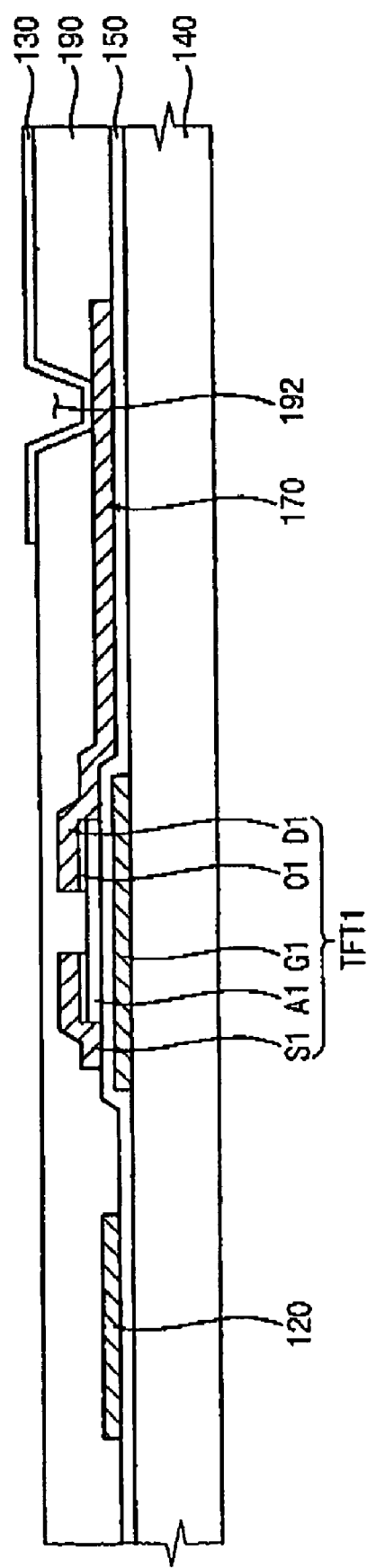

ARRAY SUBSTRATE CAPABLE OF IMPROVING DISPLAY QUALITY

CROSS-REFERENCE TO RELATED APPLICATIONS

This application relies for priority upon Korean Patent Application No. 2006-36526 filed on Apr. 24, 2006, the content of which is herein incorporated by reference in its entirety.

BACKGROUND OF THE INVENTION

1. Field of the Invention

The present invention relates to an array substrate, a display panel having the same and a method for manufacturing the same. More particularly, the present invention relates to an array substrate for enhancing a display quality of an image, a display panel having the array substrate and a method for manufacturing the array substrate.

2. Description of the Related Art

Generally, a liquid crystal display device includes a liquid crystal panel that displays an image using light transmittance of liquid crystal molecules and a backlight assembly that provides the liquid crystal display panel with light.

The liquid crystal display panel includes an array substrate having a thin-film transistor and a pixel electrode, a color filter substrate having a color filter and a common electrode and a liquid crystal layer that is disposed between the array substrate and the color filter substrate. A plurality of gate wirings and a plurality of data wirings are formed in the array, which define a plurality of pixel units. The thin-film transistor and the pixel electrode are formed in each of the pixel units.

The thin-film transistor is electrically connected to the pixel electrode. The thin-film transistor switches to control the charging of the pixel electrode. An electric field is generated between the charged pixel electrode and the common electrode. The electric field affects the alignment of the liquid crystal molecules and hence the light transmittance through the liquid crystal molecules.

The pixel electrode may be spaced apart from the data wirings that are formed next to the pixel electrode at regular intervals. That is, when a data wiring formed at a first end portion of the pixel electrode is a first data line and a data wiring formed a second end portion of the pixel electrode is a second data line, a first distance between the pixel electrode and the first data line may be equal to a second distance between the pixel electrode and the second data line.

However, a photo-misalignment may be generated during the process whereby the pixel electrode is deposited on the array substrate through a mask. The photo-misalignment of the pixel electrode changes the first distance and the second distance, so that the capacitance variation between a first capacitance value and a second capacitance value is changed. The first capacitance value is measured between the pixel electrode and the first data line, and the second capacitance value is measured between the pixel electrode and the second data line. With variation in the capacitances, the amount of charge in the pixel electrode is varied, thereby degrading a display quality of images.

SUMMARY OF THE INVENTION

The present invention provides an array substrate that does not suffer from variation of a charging voltage for a pixel electrode due to photo-misalignment of the pixel electrode.

The array substrate is able to provide a consistent display quality by avoiding fluctuation in the charge that is applied to the pixel electrode.

The present invention also provides a display panel having the above-mentioned array substrate.

The present invention also provides a method of manufacturing the above-mentioned array substrate.

In one aspect, the present invention is an array substrate that includes a pixel electrode, a gate wiring, a data wiring, a first voltage-maintaining electrode, a second voltage-maintaining electrode and a thin-film transistor. The pixel electrode contains a transparent conductive material. The gate wiring is formed on an upper or lower portion of the pixel electrode and extends in a first direction. The data wiring includes a first data line formed on a left side of the pixel electrode and extends in a second direction that is nonparallel to the first direction, and a second data line that is formed on a right side of the pixel electrode and extending in the second direction. The first voltage-maintaining electrode is spaced by a first distance from the first data line and is electrically connected to the pixel electrode. The second voltage-maintaining electrode is spaced by a second distance from the second data line and is electrically connected to the pixel electrode. The thin-film transistor is electrically connected to the gate wiring, the data wiring and the pixel electrode.

In another aspect, the present invention is a display panel that includes a first substrate, a second substrate including a common electrode substantially parallel to the first substrate, and a liquid crystal layer that is disposed between the first substrate and the second substrate. The first substrate includes a pixel electrode, a gate wiring, a data wiring, a first voltage-maintaining electrode, a second voltage-maintaining electrode and thin-film transistor. The pixel electrode contains a transparent conductive material. The gate wiring is formed on an upper or lower portion of the pixel electrode and extends in the first direction. The data wiring includes a first data line formed on a left side of the pixel electrode and extends in a second direction that is nonparallel to the first direction, and a second data line that is formed on a right side of the pixel electrode and extending in the second direction. The first voltage-maintaining electrode is spaced apart from the first data line and is electrically connected to the pixel electrode. The second voltage-maintaining electrode is spaced apart from the second data line and is electrically connected to the pixel electrode. The thin-film transistor is electrically connected to the gate wiring, the data wiring and the pixel electrode.

In still another aspect, the present invention is a method of manufacturing an array substrate. The method entails forming a gate wiring on a base substrate along a first direction, forming a gate insulation layer on the base substrate to cover the gate wiring, and forming a data wiring, a first voltage-maintaining electrode and a second voltage-maintaining electrode are formed on the gate insulation layer. The data wiring is formed along a second direction. The first voltage-maintaining electrode is separated from a first side of the data wiring. The second voltage-maintaining electrode is separated from a second side of the data wiring. A protection layer is formed on the gate insulation layer to cover the data wiring and the first and second voltage-maintaining electrodes. A contact hole is formed in the protection layer to cover the first and second voltage-maintaining electrodes. A pixel electrode is formed on the protection layer to electrically connect the first and second voltage-maintaining electrodes through the contact hole.

According to the above, each of the first and second voltage-maintaining electrodes that are electrically connected to the pixel electrode is spaced apart from the first and second data lines by substantially the same predetermined distance, so that any fluctuation in the voltage that is charged in the pixel electrode is prevented even if the photo-misalign of the pixel electrode were to occur. Therefore, a consistent display quality is maintained and the overall display quality is improved.

BRIEF DESCRIPTION OF THE DRAWINGS

The above and other advantages of the present invention will become readily apparent by reference to the following detailed description when considered in conjunction with the accompanying drawings, wherein:

FIGS. 8A and 8B are cross-sectional views illustrating the making of a data wiring, a first voltage-maintaining electrode and a second voltage-maintaining electrode in a manufacturing process for an array substrate according to an exemplary embodiment of the present invention;

FIGS. 9A and 9B are cross-sectional views illustrating the making of a protection layer in a manufacturing process for an array substrate according to an exemplary embodiment of the present invention; and FIGS. 10A and 10B are cross-sectional views illustrating the making of a pixel electrode in a manufacturing process for an array substrate according to an exemplary embodiment of the present invention.

DESCRIPTION OF THE EMBODIMENTS

Figure 1:
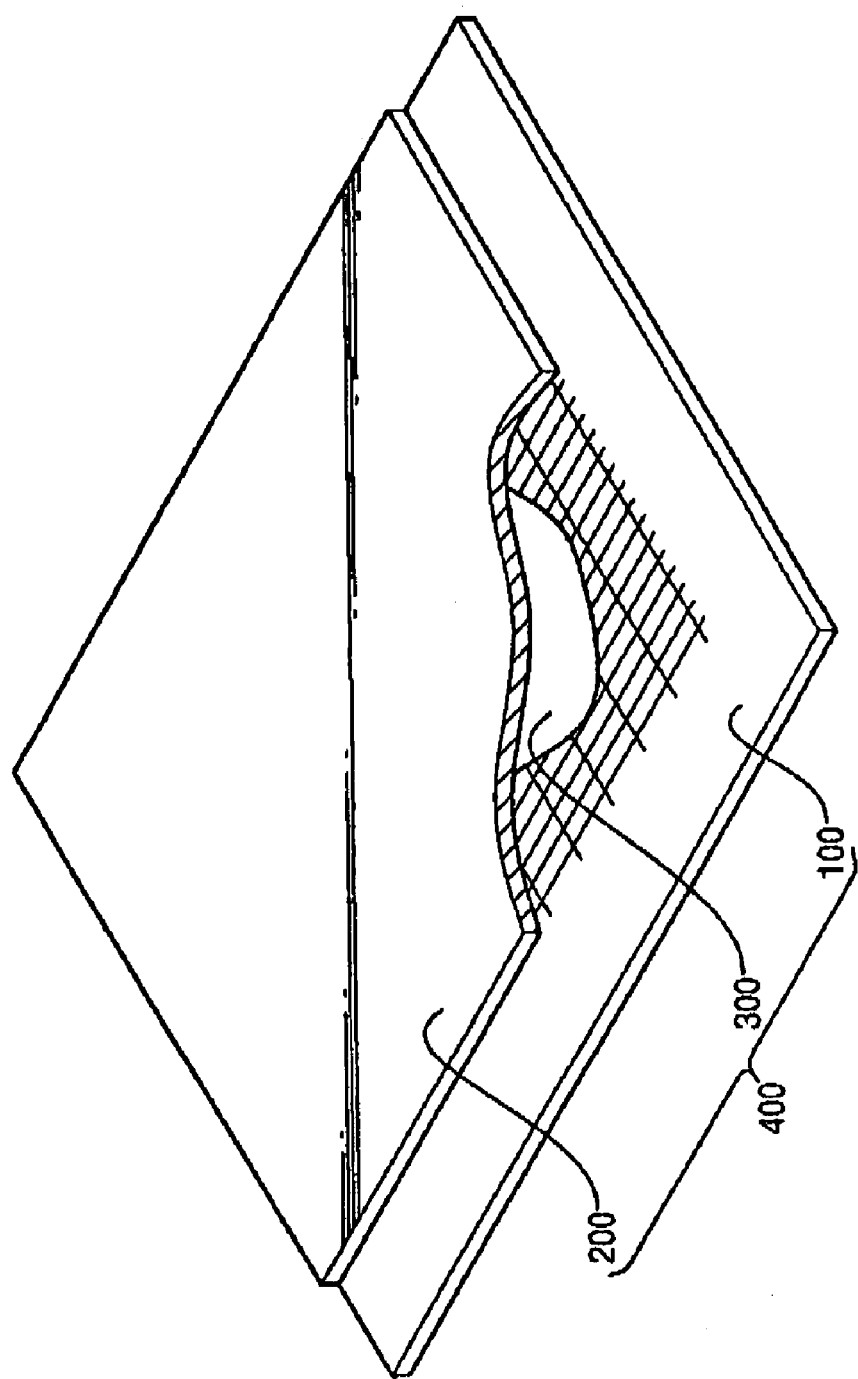
FIG. 1 is a perspective view schematically showing a display panel according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be oriented differently (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Exemplary Embodiment 1 (Display Panel)

FIG. 1 is a perspective view schematically showing a display panel according to an exemplary embodiment of the present invention.

Referring to FIG. 1, a display panel 400 according to an exemplary embodiment of the present invention includes a first substrate 100, a second substrate 200 and a liquid crystal layer 300 that is disposed between the first substrate 100 and the second substrate 200, and displays an image using lights.

The first substrate 100 includes a plurality of pixel electrodes having a matrix shape, a plurality of thin-film transistors applying a driving voltage to each pixel electrodes, and signal lines for activating each thin-film transistors.

The second substrate 200 is disposed substantially parallel to the first substrate 100. The second substrate 200 includes a common electrode that is disposed in a full surface of the first substrate 100 and color filters that is disposed to face the pixel electrodes. The common electrode includes a transparent and conductive material. The color filters include a red filter, a green filter, and a blue filter.

The liquid crystal layer 300 is disposed between the first substrate 100 and the second substrate 200. Liquid crystal molecules in the liquid crystal layer 300 are arranged and rearranged themselves in response to an electrical field. The rearranged liquid crystal layer 300 controls the transmission of light through the layer. Accordingly, the amount of light that reaches each of the color filters is controlled, so that a desired image may be displayed.

Figure 2:
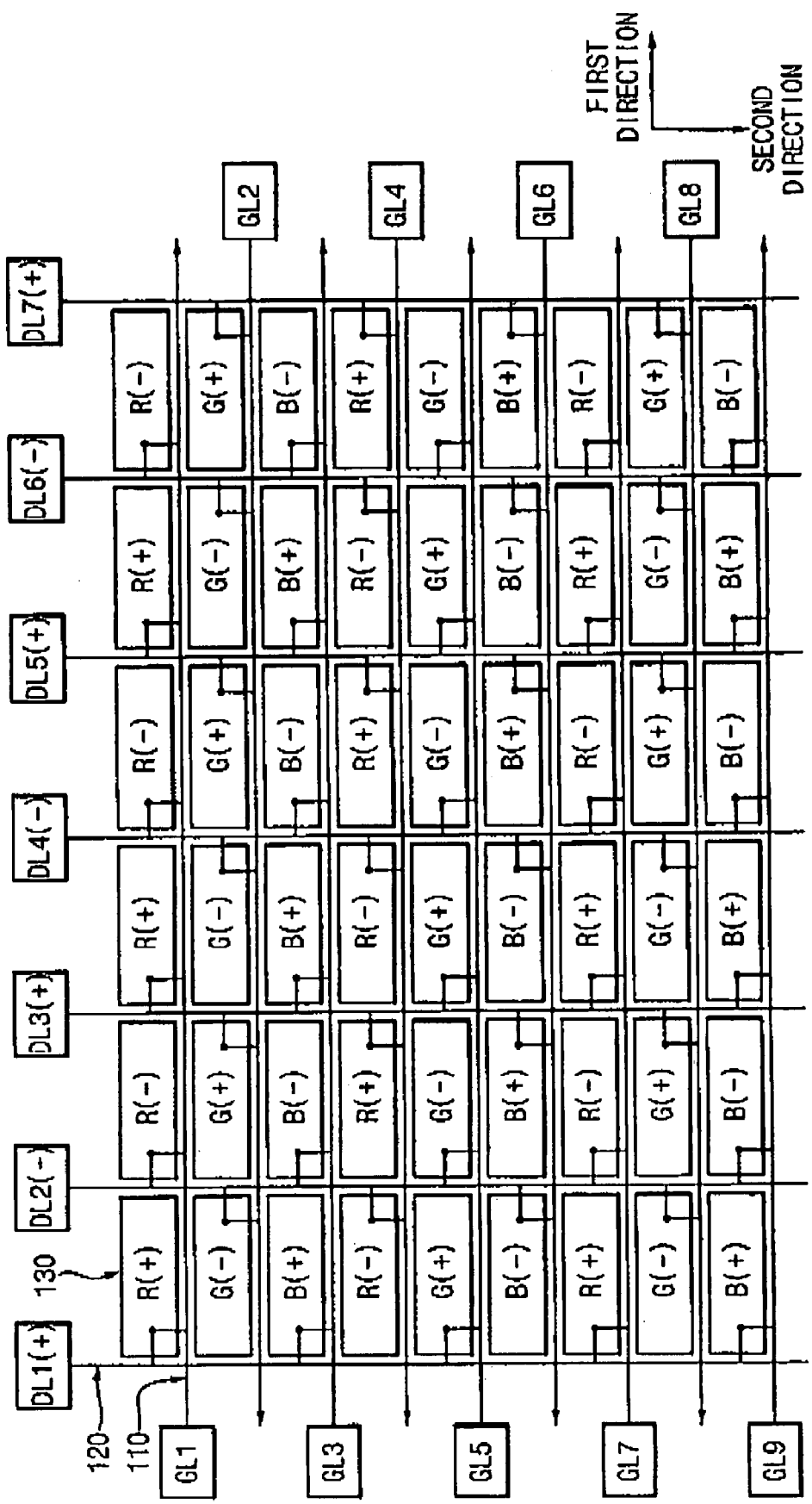
FIG. 2 is a plan view showing the first substrate of the display panel in FIG. 1.

FIG. 2 is a plan view showing the arrangement of the color filters in the first substrate of the display panel in FIG. 1.

Referring to FIG. 2, the first substrate 100 includes a plurality of gate wirings 110, a plurality of data wirings 120 and a plurality of pixel electrodes 130.

The gate wirings 110 extend along a first direction. The data wirings 120 extend along a second direction that is substantially perpendicular to the first direction. In the exemplary embodiment, nine gate wirings GL1, GL2, GL3, GL4, GL5, GL6, GL7, GL8 and GL9 are formed, and seven data wirings DL1, DL2, DL3, DL4, DL5, DL6 and DL7 are formed. The gate wirings GL1, GL2, GL3, GL4, GL5, GL6, GL7, GL8 and GL9 are electrically connected to a gate driving section (not shown) and receive a plurality of gate signals. The data wirings DL1, DL2, DL3, DL4, DL5, DL6 and DL7 are electrically connected to a data driving section (not shown) and receive a plurality of data signals. The gate wirings 110 and the data wirings 120 divide the first substrate 100 into grids of rows and columns. Hereinafter, the columns will be referred to as even-numbered columns and odd-numbered columns, which are arranged in an alternating manner from one end of the substrate to the other.

In some embodiments, the gate driving section may include a left gate driving section (not shown) and a right gate driving section (not shown). In these embodiments, the left driving section is electrically connected to a left portion of the even-numbered gate wirings GL1, GL3, GL5, GL7 and GL9 that are formed along an even row. The right driving section is electrically connected to a right portion of the odd-numbered gate wirings GL2, GL4, GL6 and GL8 that are formed along the even row. In other embodiments, the gate driving section may be electrically connected to an end portion of the gate wirings GL1, GL2, GL3, GL4, GL5, GL6, GL7, GL8 and GL9 without being divided into a left and right portion.

The gate wirings GL1, GL2, GL3, GL4, GL5, GL6, GL7, GL8 and GL9 and the data wirings DL1, DL2, DL3, DL4, DL5, DL6 and DL7 extend perpendicularly to each other, so that a plurality of pixel areas may be defined on the first substrate 100. A plurality of pixel electrodes 130 is formed on each of the pixel areas, so that the pixel electrodes 130 are disposed in the first substrate 100 in a matrix configuration.

Each of the pixel areas may have a rectangular shape that is longer in the first direction than in the second direction. The pixel electrodes 130 formed on each of the pixel areas also may have be longer in the first direction than in the second direction. In the particular embodiment of FIG. 2, the pixel electrodes 130 have a rectangular shape that is longer in the first direction than in the second.

Now, the electrical connections among the gate wirings GL1, GL2, GL3, GL4, GL5, GL6, GL7, GL8 and GL9, the data wirings DL1, DL2, DL3, DL4, DL5, DL6 and DL7 and the pixel electrodes 130 will be described in detail.

Each of the gate wirings GL1, GL2, GL3, GL4, GL5, GL6, GL7, GL8 and GL9 are electrically connected to the pixel electrodes 130 that are disposed in the second direction. However, a data wiring DL1 that is disposed at a left end portion of the data wirings DL1, DL2, DL3, DL4, DL5, DL6 and DL7 is electrically connected to the pixel electrodes 130 that are disposed in an even-numbered column. A data wiring DL7 that is disposed at a right end portion of the data wirings DL1, DL2, DL3, DL4, DL5, DL6 and DL7 is electrically connected to the pixel electrodes 130 that are disposed in an odd-numbered column. The data wirings DL2, DL3, DL4, DL5, and DL6 that are located between the data wirings DL1 and DL7 are electrically connected to the pixel electrodes 130 that are disposed in a right portion of each of the data wirings in the even-numbered columns, and electrically connected to the pixel electrodes 130 that are disposed in a left portion of each of the data wirings in the odd-numbered columns.

A plurality of data signals for a vertical inversion may be applied to each of the data wirings DL1, DL2, DL3, DL4, DL5, DL6 and DL7. In particular, during one frame interval, a positive polarity data signal is applied to a predetermined data wiring, and a negative polarity data signal is applied to a data wiring that is adjacent to the predetermined data wiring. Then, during a following frame interval, a negative polarity data signal is applied to the predetermined data wiring, and a positive polarity data signal is applied to the adjacent data wiring such that a data wiring does not receive data signals of the same polarity two frames in a row.

Hereinafter, a cross-sectional structure and a plane structure of the display panel 400 according to the present embodiment will be described in detail with reference to the accompanying drawings.

Figure 3:
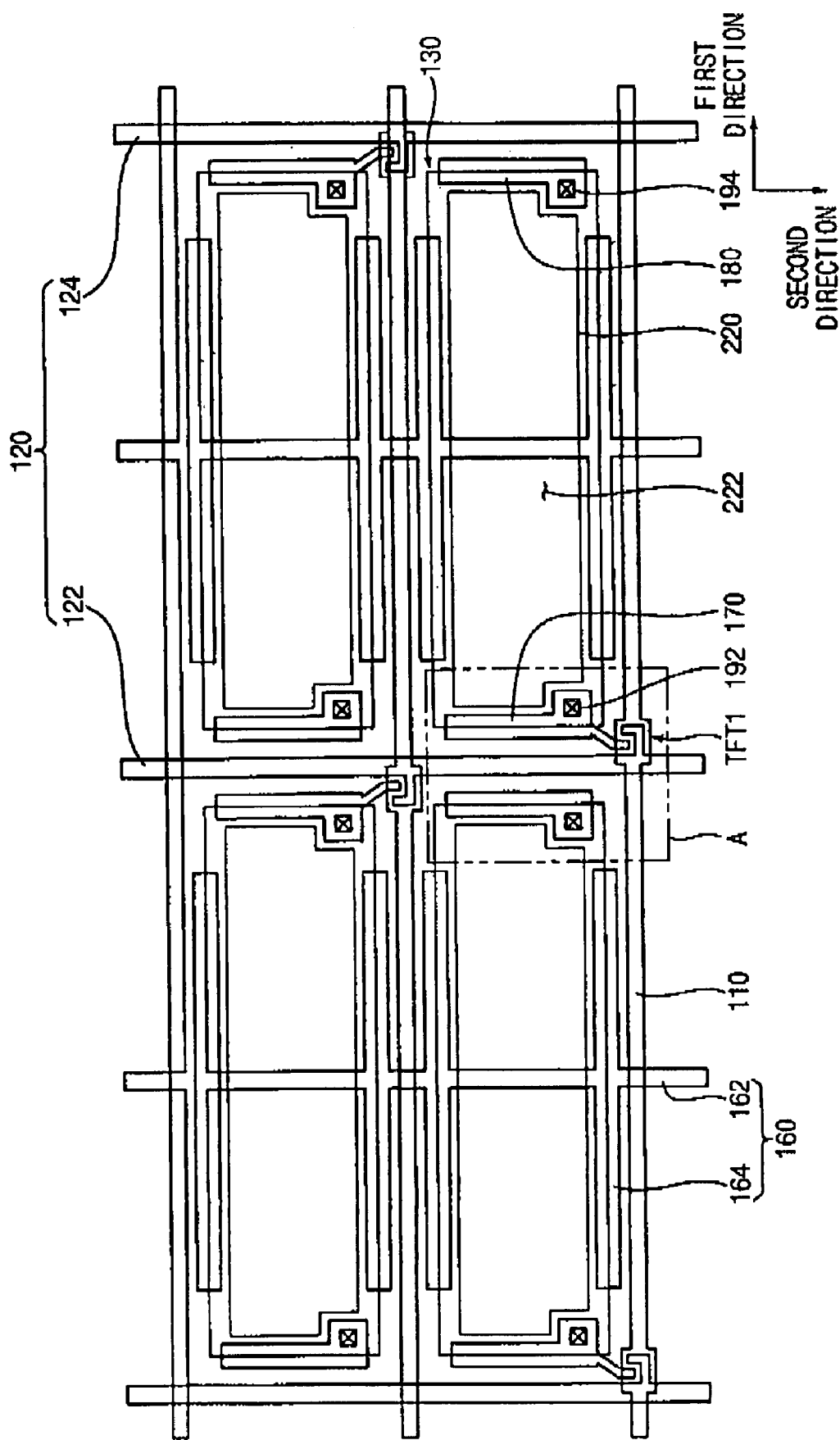
FIG. 3 is an enlarged view showing a portion of the first substrate in FIG. 2.
Figure 4:
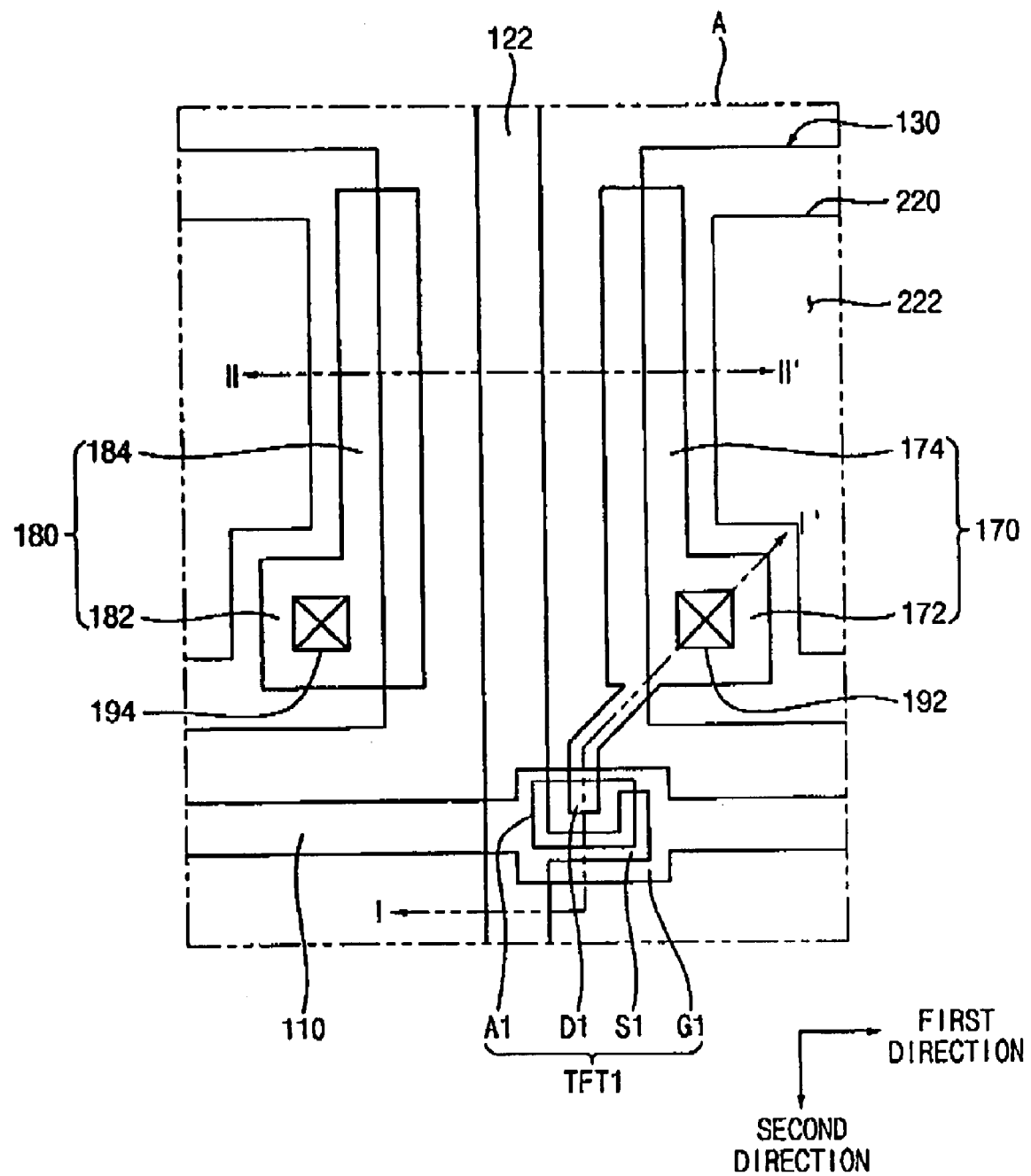
FIG. 4 is an enlarged view showing the portion 'A' in FIG. 3.
Figure 5:
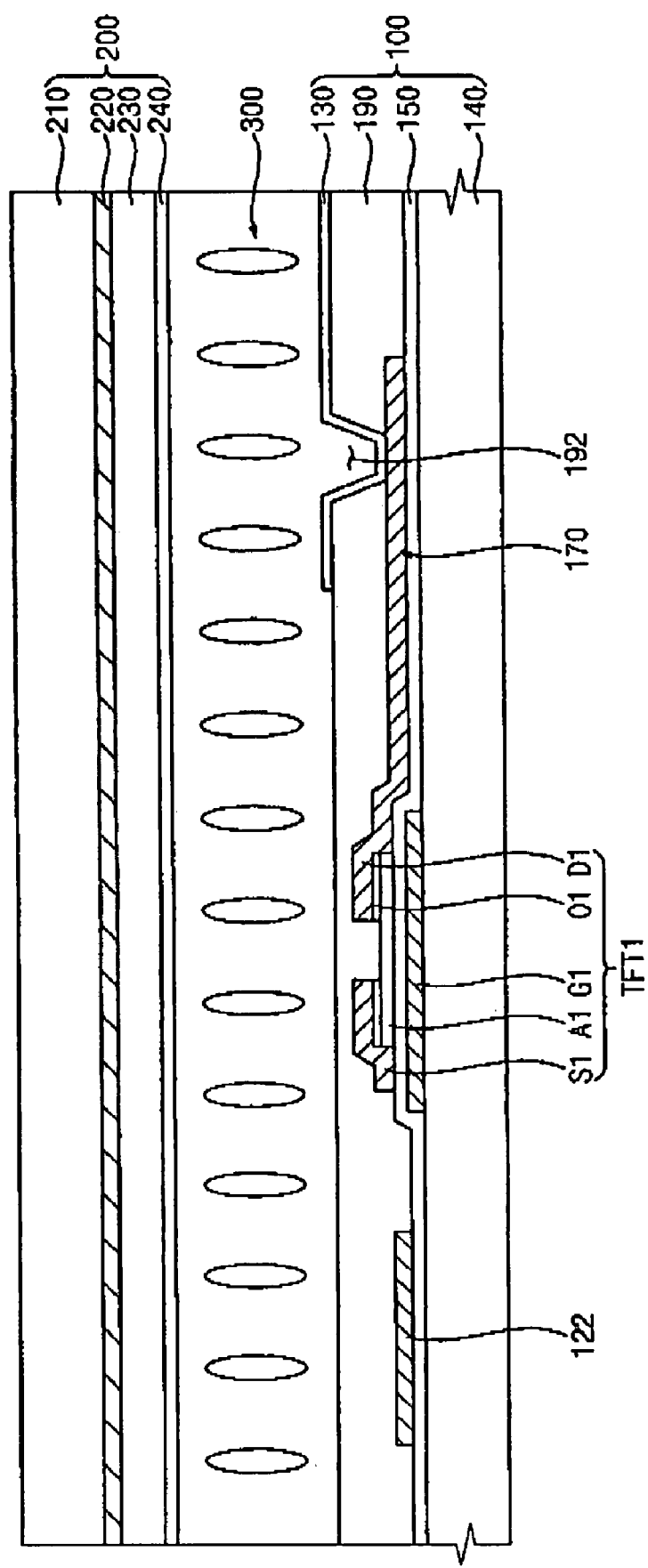
FIG. 5 is a cross-sectional view taken along the lines I-I' in FIG. 4.

FIG. 3 is an enlarged view showing a portion of the first substrate in FIG. 2. FIG. 4 is an enlarged view showing the portion 'A' in FIG. 3. FIG. 5 is a cross-sectional view taken along the lines I-I' in FIG. 4.

Referring to FIGS. 3 to 5, the first substrate 100 of the display panel 400 includes a first base substrate 140, a gate wiring 110, a gate insulation layer 150, a data wiring 120, a thin-film transistor TFT1, a first voltage-maintaining electrode 170, a second voltage-maintaining electrode 180, a protection layer 190 and a pixel electrode 130.

The first base substrate 140 is disposed below the display panel 400. The first base substrate 140 has a plate shape and contains a transparent material.

The gate wiring 110 is formed on the first substrate 140 along the first direction. The gate insulation layer 150 is formed on the first substrate 140 to cover the gate wiring 110. The data wiring 120, the storage wiring 160, the first voltage-maintaining electrode 170 and the second voltage-maintaining electrode 180 are formed on the gate insulation layer 150.

The thin-film transistor TFT1 includes a gate electrode G1, a source electrode S1, a drain electrode D1, an activation layer A1 and an ohmic contact layer O1. The gate electrode G1 extends from the gate wiring 110 along the second direction. The activation layer A1 is formed on the gate insulation layer 150 covering the gate electrode G1. The source electrode S1 extends from the data wiring 120 along the second direction to lie over the activation layer A1. The drain electrode D1 is spaced apart from the source electrode S1 and is on a portion of the activation layer A1. The ohmic contact layer O1 is formed between the activation layer A1 and the source electrode S1. Also, the ohmic contact layer O1 is formed between the activation layer A1 and the drain electrode D1.

The protection layer 190 is formed on the gate insulation layer 150 to cover the data wiring 120, the storage wiring 160, the first voltage-maintaining electrode 170, the second voltage-maintaining electrode 180 and the thin-film transistor TFT1. A first contact hole 192 and a second contact hole 194 are formed on a portion of the protection layer 190 that is on the first and second voltage-maintaining electrodes 170 and 180. The pixel electrode 130 is formed on the protection layer 190. The pixel electrode 130 is electrically connected to the first voltage-maintaining electrode 170 through the first contact hole 192. The pixel electrode 130 is electrically connected to the second voltage-maintaining electrode 180 through the second contact hole 194.

Hereinafter, a planar disposing relation of the display panel 400 according to the present embodiment will be described in detail. A plurality of the gate wirings 110 is formed along the first direction, and a plurality of data wirings 120 is formed along the second direction that is substantially perpendicular to the first direction. A pixel electrode 130 is formed on the pixel area that is defined by the gate wirings 110 adjacent to each other and the data wirings 120 adjacent to each other.

The gate wiring 110 is formed on one of the lower and upper portion of the pixel electrode 130. For example, the gate wiring 110 is formed on the lower portion of the pixel electrode 130. The data wiring 120 is formed on each of a left and right portion of the pixel electrode 130. Hereinafter, a data wiring 120 that is formed at a left portion of the pixel electrode 130 is a first data line 122, and a data wiring 120 that is formed on a right portion of the pixel electrode 130 is a second data line 124.

The first and second voltage-maintaining electrodes 170 and 180 are formed within a pixel area. The first voltage-maintaining electrode 170 is spaced apart from a right portion of the first data line 122. The first voltage-maintaining electrode 170 is electrically connected to the pixel electrode 130 through a first contact hole 192. The second voltage-maintaining electrode 180 is spaced apart from a left portion of the second data line 124. The first voltage-maintaining electrode 170 is electrically connected to the pixel electrode 130 through a second contact hole 194. The first voltage-maintaining electrode 170 and the second voltage-maintaining electrode 180 are symmetric with respect to a central line of the pixel electrode 130. The central line extends through a center of the pixel electrode 130 in the second direction.

The first voltage-maintaining electrode 170 includes a first contact part 172 and a first extending part 174. The first contact part 172 is electrically connected to the pixel electrode 130 through the first contact hole 192. The first extending part 174 extends from the first contact part 172 in the second direction 194. The second voltage-maintaining electrode 180 includes a second contact part 182 and a second extending part 184. The second contact part 182 is electrically connected to the pixel electrode 130 through the second contact hole 194. The second extending part 184 extends from the second contact part 182 in the second direction. Each of the first and second extending parts 172 and 182 has a width of about 6 μm to about 8 μm measured along the first direction.

The storage wiring 160 is formed along the second direction. In particular, the storage wiring 160 includes a main wiring 162 and a sub wiring 164. The main wiring 162 extends along the second direction across multiple pixel electrodes 130. The sub wiring 164 extends from the main wiring 162 in the first direction. For each pixel unit, the sub wiring 164 extends from two portions of the main wiring 162 along the first direction, so that the sub wiring covers a portion of the pixel electrode 130.

The thin-film transistor TFT1 is electrically connected to one of the first voltage-maintaining electrode 170 and the second voltage-maintaining electrode 180 that are formed in each of the pixel area. In particular, a drain electrode D1 of the thin-film transistor TFT1 is electrically connected to one of the first contact part 172 and the second contact part 182.

A plurality of thin-film transistors TFT1 is formed on the pixel electrodes 130 that are disposed in a matrix configuration. The thin-film transistors TFT1 that are disposed in an even-numbered column includes a drain electrode D1 electrically connecting to the first contact part 172 of the first voltage-maintaining electrode 170. The first voltage-maintaining electrode 170 is disposed in an even-numbered column. The thin-film transistors TFT1 that are disposed in an odd-numbered column includes a drain electrode D1 electrically connecting the second contact part 182 of the second voltage-maintaining electrode 180. The second voltage-maintaining electrode 180 is disposed in an odd-numbered column. That is, each of the thin-film transistors TFT1 that is disposed in the even-numbered column is electrically connected to the first data line 122 and the first contact part 172, and each of the thin-film transistor TFT1 that is disposed in the odd-numbered column is electrically connected to the second data line 124 and the second contact part 182.

In some embodiments, the second substrate 200 includes a second base substrate 210, a light blocking layer 220, a color filter 230 and a common electrode 240.

The second base substrate 210 has a plate shape and contains a transparent material.

The light blocking layer 220 is formed on the side of the second base substrate 210 that is closer to the first substrate 100. For example, the light blocking layer 220 is formed on the second base substrate 210 to cover the gate wiring 110, the data wiring 120, the thin-film transistor TFT1, the first voltage-maintaining electrode 170 and the second voltage-maintaining electrode 180. Light is transmitted to an opening area 222 of the light blocking layer 220, so that images are displayed.

The color filter 230 is formed on the second base substrate 210 and the pixel electrode 130. For example, the color filter 230 is formed on the second base substrate 210 and covers the light blocking layer 220.

The common electrode 240 is formed on the surface of the color filter 230 that is closer to the first substrate 100 upon assembly. The common electrode 240 includes a transparent and conductive material. A planarization layer (not shown) may be formed between the color filter 230 and the common electrode 240. The planarization layer may planarize a surface of the color filter 230, so that a surface of the second substrate 200 is planarized.

Figure 6:
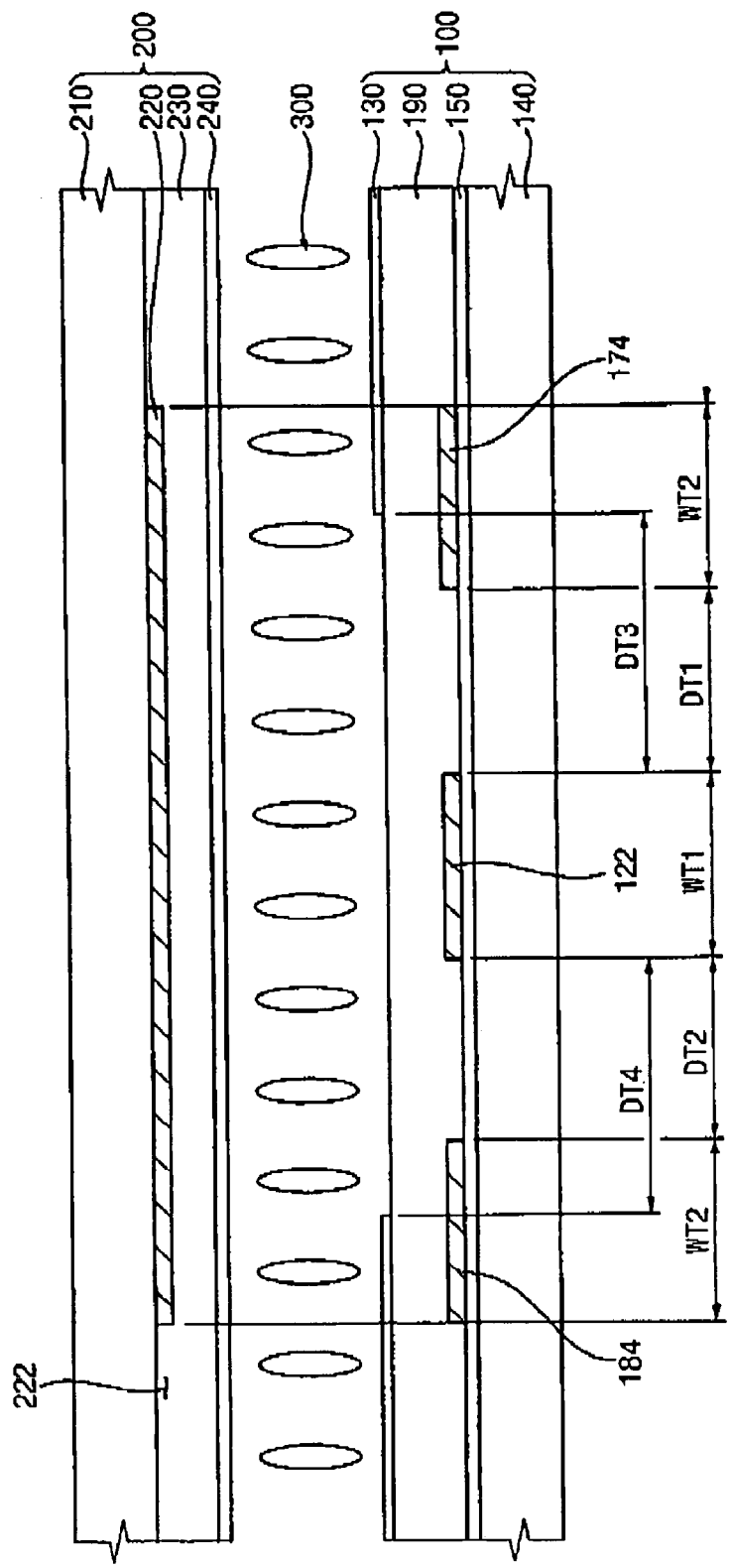
FIG. 6 is a cross-sectional view taken along the lines II-II' in FIG. 4.

FIG. 6 is a cross-sectional view taken along the lines II-II' in FIG. 4.

Hereinafter, the relationship among the lengths of the data wiring 120, the pixel electrode 130, the first voltage-maintaining electrode 170 and the second voltage-maintaining electrode 180 will be described in reference to FIGS. 4 and 6.

The first extending part 174 of the first voltage-maintaining electrode 170 is spaced apart from a right portion of the first data line 122 by a first distance DT1 along a first direction. The second extending part 184 of the second voltage-maintaining electrode 180 is spaced apart from a left portion of the first data line 122 by a second distance DT2 along the first direction. The first and second voltage-maintaining electrodes 170 and 180, the first and second extending parts 174 and 184, and the first data line 122 are formed on the gate insulation layer 150.

The first distance DT1 may be substantially equal to the second distance DT2. For example, the first distance DT1 has a range of about 5 μm to about 7 μm. Here, a width WT1 of the first data line 122 has a range of about 5 μm to about 7 μm, and each of a width WT2 of the first and second extending parts 174 and 184 has a range of about 6 μm to about 8 μm.

When seen in plan view, the pixel electrode 130 is spaced apart from a right portion of the first data line 122 by a third distance DT3 along the first direction, and is spaced apart from a left portion of the first data line 122 by a fourth distance DT4 along the first direction. Here, the first data line 122 is formed on the gate insulation layer 150 and the pixel electrode 130 is formed on the protection layer 190 that is formed on the gate insulation layer 150.

The third distance DT3 may be substantially equal to the fourth distance DT4, and may be longer than or equal to the first distance DT1. For example, the third distance DT3 may have a range of about 8 μm to about 10 um.

The light blocking layer 220 may be wide enough along the first direction to cover all of the data wiring 120 and the first and second voltage-maintaining electrodes 170 and 180.

According to the exemplary embodiment, the first voltage-maintaining electrode 170 is spaced apart from a right portion of the first data line 122 by the first distance DT1, and the second voltage-maintaining electrode 180 is spaced apart from a left portion of the first data line 122 by the second distance DT2. The first and second voltage-maintaining electrodes 170 and 180 are formed in the same layer as the first data line 122. In particular, the first and second voltage-maintaining electrodes 170 and 180 are spaced apart from the first data line 122 by the same distance (DT1=DT2).

Thus, even if the photo-misalignment with respect to the data wiring 120 may occur during the formation of the pixel electrode 130 on the protection layer 190, this photo-misalignment does not affect the charge in the pixel electrode 130.

Conventionally, when the pixel electrode 130 is formed on the protection layer 190 through a mask, photo-misalignment may occur with respect to the data wiring 120. The photo-misalignment of the pixel electrode 130 may affect the first distance DT1 between the first voltage-maintaining electrode 170 and the first data line 122 and the second distance DT2 between the second voltage-maintaining electrode 180 and the first data line 122. Therefore, the capacitance between the pixel electrode 130 and the first data line 122 is changed, as is the capacitance between the pixel electrode 130 and the first data line 122. As a result, the voltage that is applied the pixel electrode 130 fluctuates.

However, when the first and second voltage-maintaining electrodes 170 and 180 are spaced apart from the data wiring 120 and formed from the same layer as the data wiring 120, the capacitance between the first voltage-maintaining electrode 170 and the first data line 122 is substantially equal to the capacitance between the second voltage-maintaining electrode 180 and the second data line 124 even if photo-misalignment of the pixel electrode 130 occurs. Therefore, a voltage that is applied to the pixel electrode 130 is not affected by the photo-misalignment and the display quality remains constant.

Exemplary Embodiment 2 (Display Panel)

Figure 7:
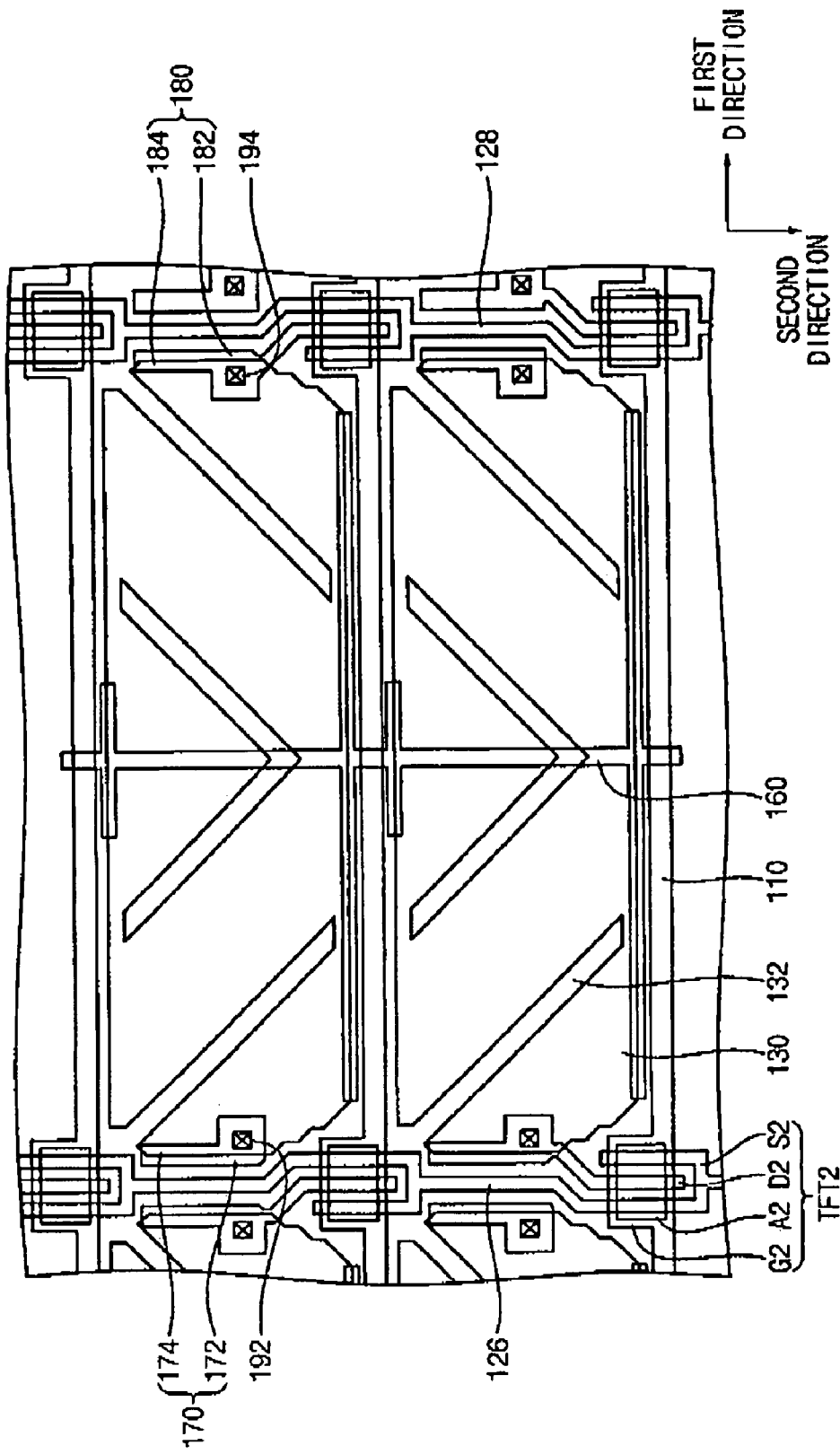
FIG. 7 is a plan view showing a portion of the first substrate of the display panel according to another exemplary embodiment of the present invention.

FIG. 7 is a plan view showing a portion of the first substrate of the display panel according to another exemplary embodiment of the present invention. The first substrate according to the present embodiment is substantially the same as the display panel described in Exemplary embodiment 1 except for the data wiring and a thin-film transistor. Although FIG. 7 shows a differently-shaped pixel electrode 130 than the embodiment of FIG. 3, this is merely illustrative and not a limitation of this exemplary embodiment. Thus, the same reference numerals will be used to refer to the same or like parts as those described in Exemplary embodiment 1 and any redundant explanation concerning the above elements will be omitted.

Referring to FIG. 7, a plurality of data wirings according to the present embodiment are formed along a second direction. The data wirings are classified into a first data line 126 and a second data line 128. The first data line 126 is formed at a left portion of a pixel electrode 130, and the second data line 128 is formed at a right portion of the same pixel electrode 130.

The first data line 126 and the second data line 128 have a hook-shape when seen in plan view, whereby the hooks bend to the right and to the left in an alternating manner for each data line. In the embodiment of FIG. 7, each of the first and second data lines 126 and 128 includes a U-shaped hook.

The thin-film transistor TFT2 includes a gate electrode G2, an activation layer A2, a source electrode S2, a drain electrode D2 and an ohmic contact layer (not shown). The gate electrode G2 extends from the gate wiring 110 along the second direction. The activation layer A2 is formed on the gate insulation layer 150 and on the gate electrode G2. The source electrode S2 includes the U-shape of one of the first data line 126 and the second data line 128 and covers the activation layer A2. The drain electrode D2 is spaced apart from the source electrode S2 and covers a portion of the activation layer A2. The ohmic contact layer is formed between the activation layer A2 and the source electrode S2. Also, the ohmic contact layer is formed between the activation layer A2 and the drain electrode D2.

Hereinafter, the drain electrode D2 of the thin-film transistor TFT2 will be described in detail.

A plurality of thin-film transistors TFT2 is formed on the pixel electrodes 130 that are disposed in a matrix configuration. Each of the drain electrodes D2 that are disposed in an even-numbered column are formed parallel to each of the drain electrodes D2 that are disposed in an odd-numbered column along the second direction. In particular, each of the drain electrodes of the even-numbered column is formed on an imaginary line that extends parallel to the first data line 126. Similarly, each of the drain electrodes of the odd-numbered column are formed on another imaginary line that extends parallel to the second data line 128. That is, each of the drain electrodes D2 of the thin-film transistor TFT2 is disposed at one of the central axes of the first and second data lines 126 and 128.

Each of the drain electrode D2 of the thin-film transistors TFT2 is electrically connected to one of the first voltage-maintaining electrode 170 and the second voltage-maintaining electrode 180 that are formed on the same pixel area. More specifically, the drain electrode D2 of the thin-film transistor TFT2 that is disposed on an even-numbered column is electrically connected to the first contact part 172 of the first voltage-maintaining electrode 170 of the even-numbered column. Also, the drain electrode D2 of the thin-film transistor TFT2 that is disposed on an odd-numbered column is electrically connected to the second contact part 182 of the second voltage-maintaining electrode 180 of the odd-numbered column.

Exemplary Embodiment (Method of Manufacturing an Array Substrate)

Hereinafter, a method of manufacturing the first substrate 100 of the display panel 400 according to the exemplary embodiment as described above will be explained in detail with reference to additional figures. Hereinafter, the array substrate is another designation or name of the first substrate 100.

Figure 8B:
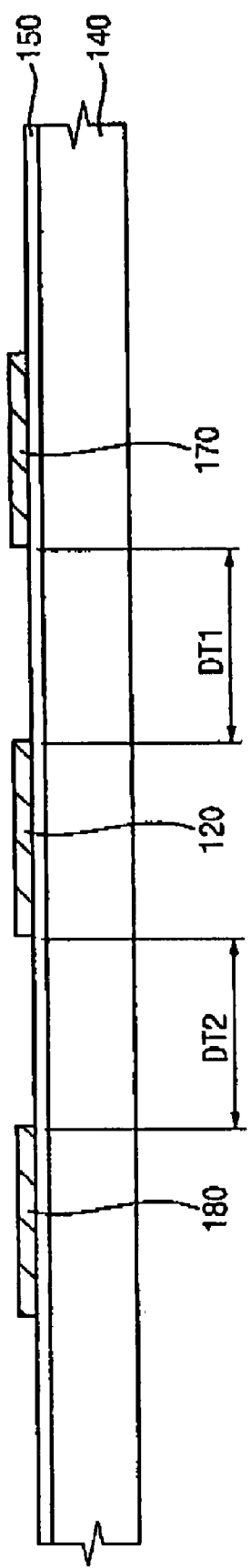

FIGS. 8A and 8B are cross-sectional views illustrating the making of a data wiring, a first voltage-maintaining electrode and a second voltage-maintaining electrode in a manufacturing process for an array substrate according to an exemplary embodiment of the present invention.

Referring to FIGS. 8A and 8B, a gate wiring is formed on a base substrate 140 along a first direction. The gate wiring is formed on the base substrate 140 by patterning a metal layer that is deposited by a sputtering method. Here, a gate electrode G1 is defined by a portion that extends from the gate wiring in a second direction perpendicular to the first direction.

Then, a gate insulation layer 150 is formed on the base substrate 140 on which the gate wiring is formed, so that the gate insulation layer 150 covers the gate wiring. An activation layer A1 and an ohmic contact layer O1 are deposited on the gate insulation layer 150, and the activation layer A1 and the ohmic contact layer O1 are partially removed.

Then, a data wiring 120, a first voltage-maintaining electrode 170 and a second voltage-maintaining electrode 180 are simultaneously formed on the gate insulation layer 150. The data wiring 120 extends along the second direction. The first and second voltage-maintaining electrodes 170 and 180 are formed from the data wiring 120. The first voltage-maintaining electrode 170 is spaced apart from a right portion of the first data line 122 by a first distance DT1 along the first direction. The second voltage-maintaining electrode 180 is spaced from a left portion of the first data line 122 apart by a second distance DT2 along the first direction. The first distance DT1 may be substantially equal to the second distance DT2. For example, the first distance DT1 and the second distance DT2 may have a range of about 5 µm to about 7 µm.

In addition, when the data wiring 120 is formed on the gate insulation layer 150, a source electrode S1 and a drain electrode D1 are simultaneously formed on the gate insulation layer 150. The source electrode S1 extends from the data wiring 120 along the second direction to cover a portion of the activation layer A1. The drain electrode D1 is spaced apart from the source electrode S1 and covers a portion of the activation layer A1. The drain electrode D1 is electrically connected to one of the first voltage-maintaining electrode 170 and the second voltage-maintaining electrode 180 that are formed in each of the pixel area.

Figure 9B:
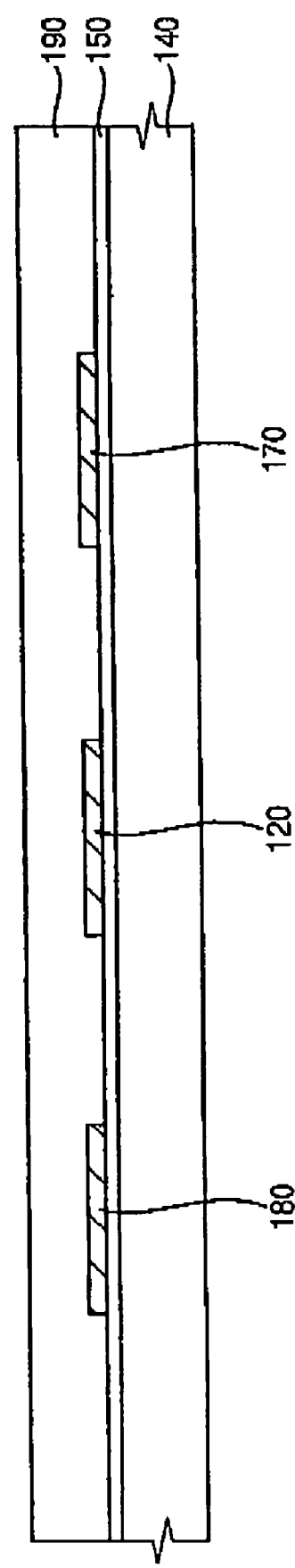

FIGS. 9A and 9B are cross-sectional views illustrating the making a protection layer in a manufacturing process for an array substrate according to an exemplary embodiment of the present invention.

Referring to FIGS. 9A and 9B, a protection layer 190 is formed on the gate insulation layer on which the data wiring 120, the first voltage-maintaining electrode 170 and the second voltage-maintaining electrode 180 are formed, so that the protection layer 190 covers the data wiring 120, the first voltage-maintaining electrode 170 and the second voltage-maintaining electrode 180.

A portion of the protection layer 190 is removed by an etching process, so that a contact hole 192 is formed. The contact hole 192 is formed on an area corresponding to the first and second voltage-maintaining electrodes 170 and 180, respectively.

Figure 10B:
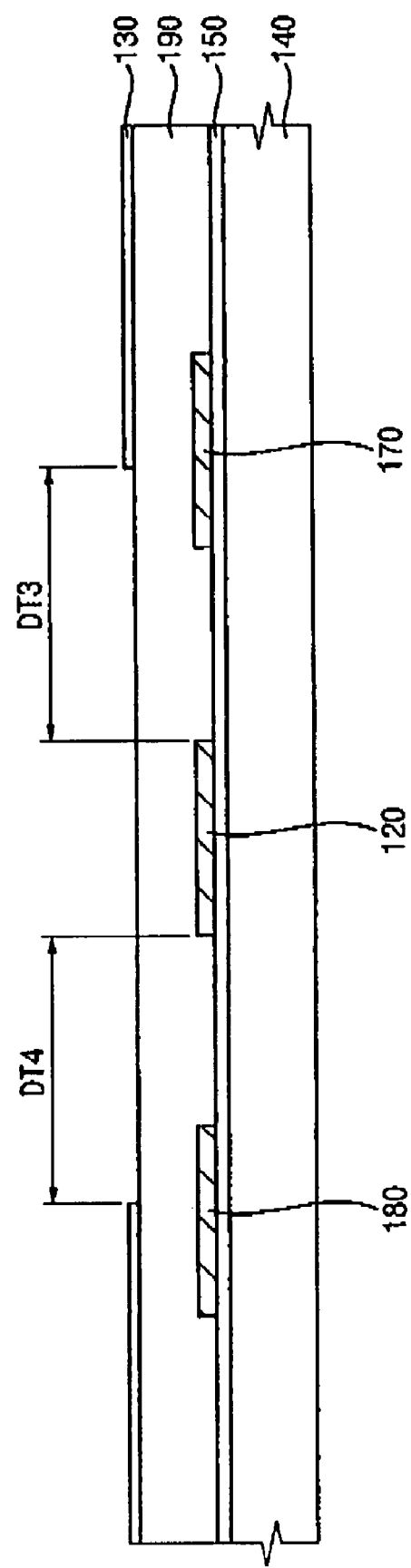

FIGS. 10A and 10B are cross-sectional views illustrating the making of a pixel electrode during the manufacturing process for an array substrate according to an exemplary embodiment of the present invention.

Referring to FIGS. 10A and 10B, a pixel electrode 130 is formed on the protection layer 190, which is electrically connected to the first and second voltage-maintaining electrodes 170 and 180 through the contact hole 192. When seen in plan view, the pixel electrode 130 is spaced apart from a right portion of the first data line 122 by a third distance DT3 and is spaced apart from a left portion of the first data line 122 by a fourth distance DT4. Here, the third distance DT3 may be substantially equal to the fourth distance DT4, and may be longer than or equal to the first distance DT1. For example, the third distance DT3 has a range of about 8 µm to about 10 µm.

According to the present invention, each of the first and second voltage-maintaining electrodes are spaced apart from the data line by a predetermined distance, so that the voltage that is applied to the pixel electrode is not affected by any photo-misalignment that may be generated. Therefore, undesirable variation or fluctuation in the luminance level of displayed images is prevented and a consistent display quality is achieved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An array substrate comprising:
    a pixel electrode that contains a transparent conductive material;
    a gate wiring formed on an upper or lower portion of the pixel electrode and extending in a first direction;
    a data wiring including a first data line formed on a left side of the pixel electrode and extending in a second direction that is nonparallel to the first direction, and a second data line that is formed on a right side of the pixel electrode and extending in the second direction;
    a first voltage-maintaining electrode spaced by a first distance from the first data line along the first direction, the first voltage-maintaining electrode being electrically connected to the pixel electrode;
    a second voltage-maintaining electrode spaced by a second distance from the second data line along the first direction, the second voltage-maintaining electrode being electrically connected to the pixel electrode;
    a thin-film transistor electrically connected to the gate wiring, the data wiring and the pixel electrode, and
    a storage wiring extending in the second direction across the pixel electrode, the storage wiring and the data wiring being formed from the same layer,
    wherein the pixel electrode is separated from the first data line by a third distance along the first direction, and the third distance is greater than or equal to the first distance.

2. The array substrate of claim 1, wherein the pixel electrode is longer in the first direction than in the second direction.

3. The array substrate of claim 1, wherein the first and second voltage-maintaining electrodes are formed from the same layer as the data wiring.

4. The array substrate of claim 3, wherein the first distance is substantially equal to the second distance.

5. The array substrate of claim 4, wherein a range of the first distance is about 5 μm to 7 μm.

6. The array substrate of claim 4, wherein
the pixel electrode is separated from the second data line by a fourth distance, and
the third distance is substantially equal to the fourth distance.

7. The array substrate of claim 3, further comprising a protection layer that is disposed between the first and second voltage-maintaining electrodes and the pixel electrode,
a first contact hole and a second contact hole are formed in the protection layer, the first contact hole being electrically connected to the first voltage-maintaining electrode and the pixel electrode, and the second contact hole being electrically connected to the second voltage-maintaining electrode and the pixel electrode.

8. The array substrate of claim 7, wherein the first voltage-maintaining electrode and the second voltage-maintaining electrode are arranged symmetrically with respect to an imaginary line that is disposed at a center portion of the pixel electrode and extends in the second direction.

9. The array substrate of claim 8, wherein the first voltage-maintaining electrode comprises a first contact part that is electrically connected to the pixel electrode through the first contact hole and a first extending part extending from the first contact part in the second direction, and
the second voltage-maintaining electrode comprises a second contact part that is electrically connected to the pixel electrode through the second contact hole and a second extending part extending from the second contact part in the second direction.

10. The array substrate of claim 9, wherein each of the first and second extending parts has a width of about 6 μm to about 8 μm measured along the first direction.

11. The array substrate of claim 9, wherein the drain electrode of the thin-film transistor is directly connected to one of the first contact part and the second contact part.

12. The array substrate of claim 11, wherein the pixel electrode is formed to define a pixel area, and wherein the pixel electrode is one of multiple pixel electrodes defining multiple pixel areas disposed in a matrix configuration having rows, even-numbered columns, and odd-numbered columns, and the first and second voltage-maintaining electrodes and the thin-film transistor are disposed in the pixel areas defined by the pixel electrodes,
each of drain electrodes of the thin-film transistors disposed in one of the even numbered columns is electrically connected to the first contact part of the first voltage-maintaining electrode that are disposed in the same column, and each of drain electrodes of the thin-film transistors disposed in one of the odd-numbered columns is electrically connected to the second contact part of the second voltage-maintaining electrode that are disposed in the same column.

13. The array substrate of claim 12, wherein each of the drain electrode of the thin-film transistors disposed along the even-numbered column and the drain electrode of the thin-film transistors disposed along the odd-numbered column is formed on an imaginary line extending in the second direction.

14. The array substrate of claim 13, wherein each of the drain electrode of the thin-film transistors disposed along the even-numbered column and the drain electrode of the thin-film transistors disposed along the odd-numbered column is formed on an imaginary line substantially parallel to the length of the data wiring.

15. A display panel comprising:
a first substrate;
a second substrate having a common electrode substantially parallel to the first substrate; and
a liquid crystal layer disposed between the first substrate and the second substrate, wherein the first substrate comprises:
a pixel electrode that contains a transparent conductive material;
a gate wiring formed on an upper or lower portion of the pixel electrode and extending in a first direction;
a data wiring including a first data line formed on a left side of the pixel electrode and extending in a second direction that is nonparallel to the first direction, and a second data line that is formed on a right side of the pixel electrode extending in the second direction;
a first voltage-maintaining electrode spaced apart from the first data line by a first distance along the first direction, the first voltage-maintaining electrode being electrically connected to the pixel electrode;
a second voltage-maintaining electrode spaced apart from the second data line by a second distance along the first direction, the second voltage-maintaining electrode being electrically connected to the pixel electrode;
a thin-film transistor electrically connected to the gate wiring, the data wiring and the pixel electrode; and
a storage wiring extending in the second direction across the pixel electrode, the storage wiring and the data wiring being formed from the same layer,
wherein the pixel electrode is separated from the first data line by a third distance along the first direction, and the third distance is greater than or equal to the first distance.

16. The display panel of claim 15, wherein the second substrate further comprises a light blocking layer formed on the common electrode to cover the first and second voltage-maintaining electrodes and the data wiring.

17. A method of manufacturing an array substrate comprising:
forming a gate wiring on a base substrate along a first direction;
forming a gate insulation layer on the base substrate to cover the gate wiring;
forming a data wiring, a first voltage-maintaining electrode and a second voltage-maintaining electrode on the gate insulation layer, wherein the data wiring is formed along a second direction, the first voltage-maintaining electrode is separated from a first side of the data wiring, and the second voltage-maintaining electrode is separated from a second side of the data wiring;
forming a protection layer on the gate insulation layer to cover the data wiring and the first and second voltage-maintaining electrodes;
forming a contact hole in the protection layer to cover the first and second voltage-maintaining electrodes;

forming a pixel electrode on the protection layer to electrically connect the first and second voltage-maintaining electrodes through the contact hole;

forming a thin-film transistor electrically connected to the gate wiring, the data wiring, and the pixel electrode; and forming the thin-film transistor with a drain electrode directly connected to at least one of the first voltage-maintaining electrode and the second voltage-maintaining electrode.

18. The array substrate of claim 1, wherein a drain electrode of the thin-film transistor is directly connected to at least one of the first voltage-maintaining electrode and the second voltage-maintaining electrode.

19. The array substrate of claim 1, wherein the storage wiring comprises a main wiring extending along the second direction across multiple pixel electrodes and a sub-wiring extending from the main wiring in the first direction.

20. The array substrate of claim 19, wherein the sub-wiring covers a portion of the pixel electrode.

21. The display panel of claim 15, wherein the thin-film transistor has a drain electrode directly connected to at least one of the first voltage-maintaining electrode and the second voltage-maintaining electrode.

* * * * *